United States Patent
Tatina

(10) Patent No.: US 6,530,729 B2
(45) Date of Patent: Mar. 11, 2003

(54) VEHICLE TIRE TIE-DOWN SYSTEM AND METHOD

(75) Inventor: Richard A. Tatina, Countryside, IL (US)

(73) Assignee: Portec Rail Products, Inc., Oak Brook, IL (US)

(*) Notice: Subject to any disclaimer, the term of this patent is extended or adjusted under 35 U.S.C. 154(b) by 9 days.

(21) Appl. No.: 09/891,827

(22) Filed: Jun. 26, 2001

(65) Prior Publication Data

US 2002/0197126 A1 Dec. 26, 2002

(51) Int. Cl.$^7$ ................................................ B60P 3/077
(52) U.S. Cl. ............................ 410/7; 410/12; 410/19; 248/499
(58) Field of Search .......................... 410/7, 8, 9, 10, 410/11, 12, 19, 20, 23; 248/499

(56) References Cited

U.S. PATENT DOCUMENTS

| | | | | |
|---|---|---|---|---|
| 1,254,920 A | * | 1/1918 | Mathias | 410/10 |
| 3,140,850 A | * | 7/1964 | Pakard | 410/10 |
| 3,157,133 A | * | 11/1964 | Wojcikowski | 410/12 |
| 3,181,886 A | * | 5/1965 | Blunden et al. | 410/12 |
| 3,972,500 A | * | 8/1976 | Johnson et al. | 410/85 |
| 4,668,140 A | | 5/1987 | Blunden | 410/10 |
| 4,786,223 A | * | 11/1988 | Crissy et al. | 410/20 |
| 4,836,726 A | | 6/1989 | Robertson et al. | 410/9 |
| 4,838,473 A | | 6/1989 | Blunden et al. | 410/9 |
| 4,875,813 A | | 10/1989 | Moyer et al. | 410/9 |
| 4,960,353 A | * | 10/1990 | Thorndyke | 410/20 |
| 5,011,347 A | * | 4/1991 | Bullock | 410/9 |
| 5,106,245 A | * | 4/1992 | Fritz et al. | 410/9 |
| 5,108,237 A | * | 4/1992 | Zankich | 410/21 |
| 5,137,405 A | * | 8/1992 | Klein | 410/94 |
| 5,294,221 A | * | 3/1994 | Eller et al. | 410/30 |
| 5,316,421 A | | 5/1994 | Bullock et al. | 410/9 |
| 5,586,849 A | * | 12/1996 | Kissel et al. | 410/10 |
| 5,674,033 A | * | 10/1997 | Ruegg | 410/104 |
| 6,139,231 A | * | 10/2000 | Kissel | 410/20 |
| 6,164,882 A | * | 12/2000 | Selle | 410/3 |
| 6,171,037 B1 | * | 1/2001 | Andre | 410/20 |
| 6,238,153 B1 | * | 5/2001 | Karrer | 410/102 |

* cited by examiner

*Primary Examiner*—D. Glenn Dayoan
*Assistant Examiner*—Paul Chenevert
(74) *Attorney, Agent, or Firm*—Schiff Hardin & Waite

(57) ABSTRACT

In a method and system for tying a tire of a vehicle on a load carrying platform, at least first and second integral winch and chock assemblies are aligned at both ends of at least one of the tires of the vehicle so that a chock surface of the respective assemblies abuts the tire at both ends thereof. Each of the assemblies is providing with a winding mandrel. The winch and chock assemblies are locked to the platform to prevent lateral, longitudinal and vertical movement of the assemblies. A tire harness connects to the two winch and chock assemblies, the tire harness wrapping around a top portion of the tire. At least one or both of the winding mandrels of the winch and chock assemblies are then rotated to tighten the harness on the tire.

13 Claims, 4 Drawing Sheets

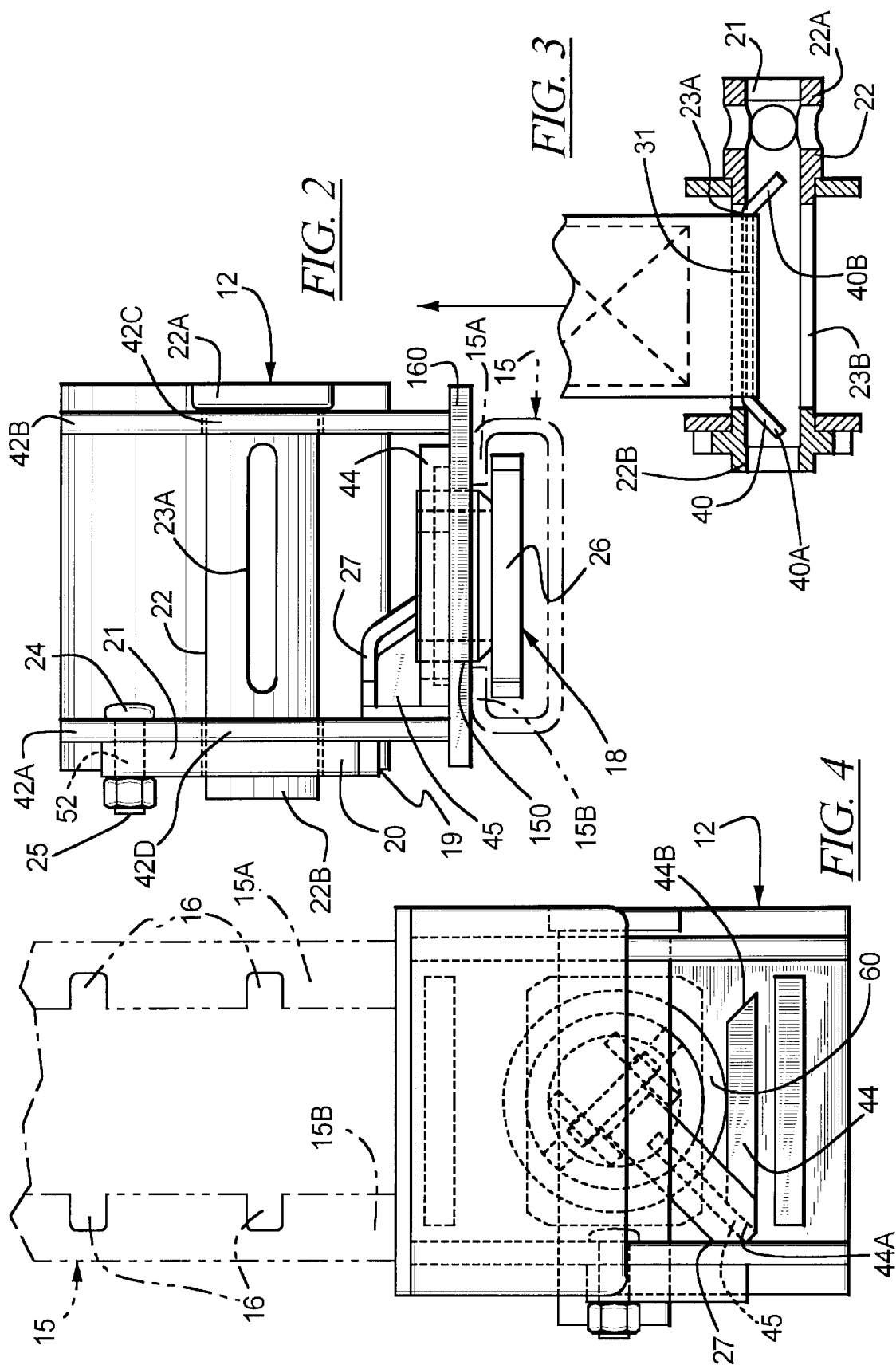

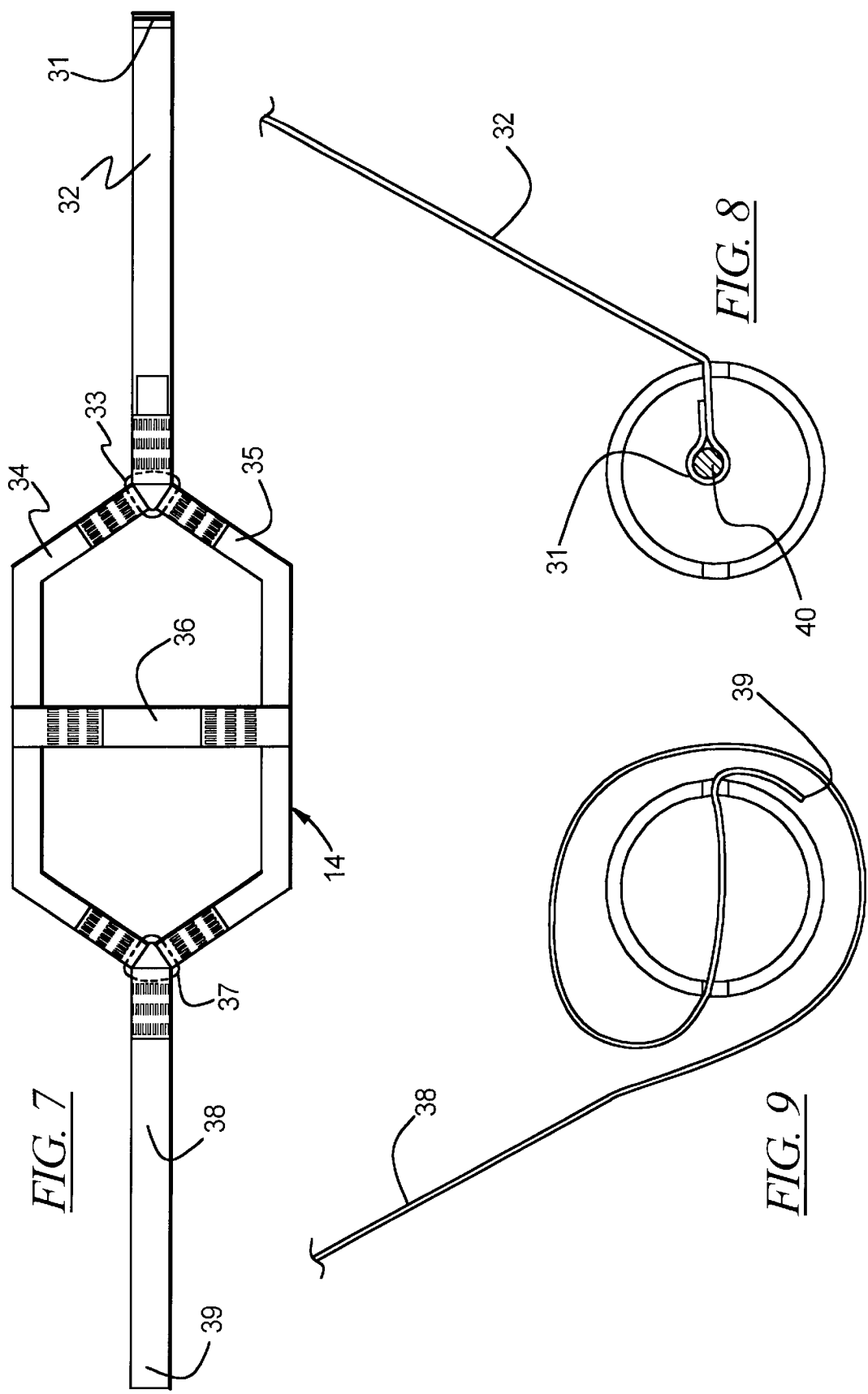

VEHICLE TIRE TIE-DOWN SYSTEM AND METHOD

BACKGROUND OF THE INVENTION

Frequently it is necessary to secure a vehicle onto the flat bed of a load carrying platform such as a railcar.

Previously, it has been known to secure a vehicle onto the load carrying platform by preventing the movement of the wheels through use of chocks which are placed at one or both ends of one or more tires of the vehicle. It has also been known to use a tire harness positioned over and around a portion of a tire in addition to the use of the chocks. See for example, U.S. Pat. Nos. 4,668,140; 4,836,726; 4,875,813; 4,838,743; and, 5,316,421. These prior art systems, however, are expensive to manufacture, difficult to use, and, in some cases, require twists in the webbing of the securing harness, and are difficult to install. Furthermore, the prior art systems are subject to potential failure.

SUMMARY OF THE INVENTION

It is an object of the invention to provide a vehicle tire tie-down system and method which solves the problems present in the prior art, and including providing a system which is simple to manufacture, less expensive, convenient to install and use and which is strong and not subject to failure.

According to the method and system of the invention for tying a tire of a vehicle on a load carrying platform, the vehicle is placed on the platform. At least first and second integral winch and chock assemblies are aligned at both ends of the tire so that a chock surface abuts the tire at both ends thereof. Each of the winch and chock assemblies is locked to the platform to prevent both a lateral and a vertical movement of the assembly. The tire harness is connected to at least one of the winch and chock assemblies. A winding mandrel is rotated on at least one of the winch and chock assemblies so as to tighten the harness on the tire. In at least one of the preferred embodiments, a curved surface is provided as the chock surface. A winding mandrel is provided on each of the winch and chock assemblies so that the tire harness can be tightened at either or both of the winch and chock assemblies.

Additionally, in at least one of the preferred embodiments, two slots are provided in the winding mandrel for receiving a respective end of the tire harness.

BRIEF DESCRIPTION OF THE DRAWINGS

FIG. 2 is an end view of the right hand winch and chock assembly of the invention;

FIG. 3 is a fragmentary cross-sectional view showing attachment of one end of the tire harness to the mandrel of the winch and chock assembly of FIG. 2;

FIG. 4 is a top view of the winch and chock assembly of FIG. 2;

FIG. 7 is a top view of the tire harness used in the vehicle tire tie-down system of FIG. 1;

FIG. 8 is a fragmentary end view of a web loop end of the tire harness connected to the mandrel of the right hand winch and chock assembly of FIG. 2; and FIG. 9 is a fragmentary end view showing the opposite end of the tire harness connected to the mandrel of the left hand winch and chock assembly shown in FIG. 1.

DESCRIPTION OF THE PREFERRED EMBODIMENT

Figure 1:
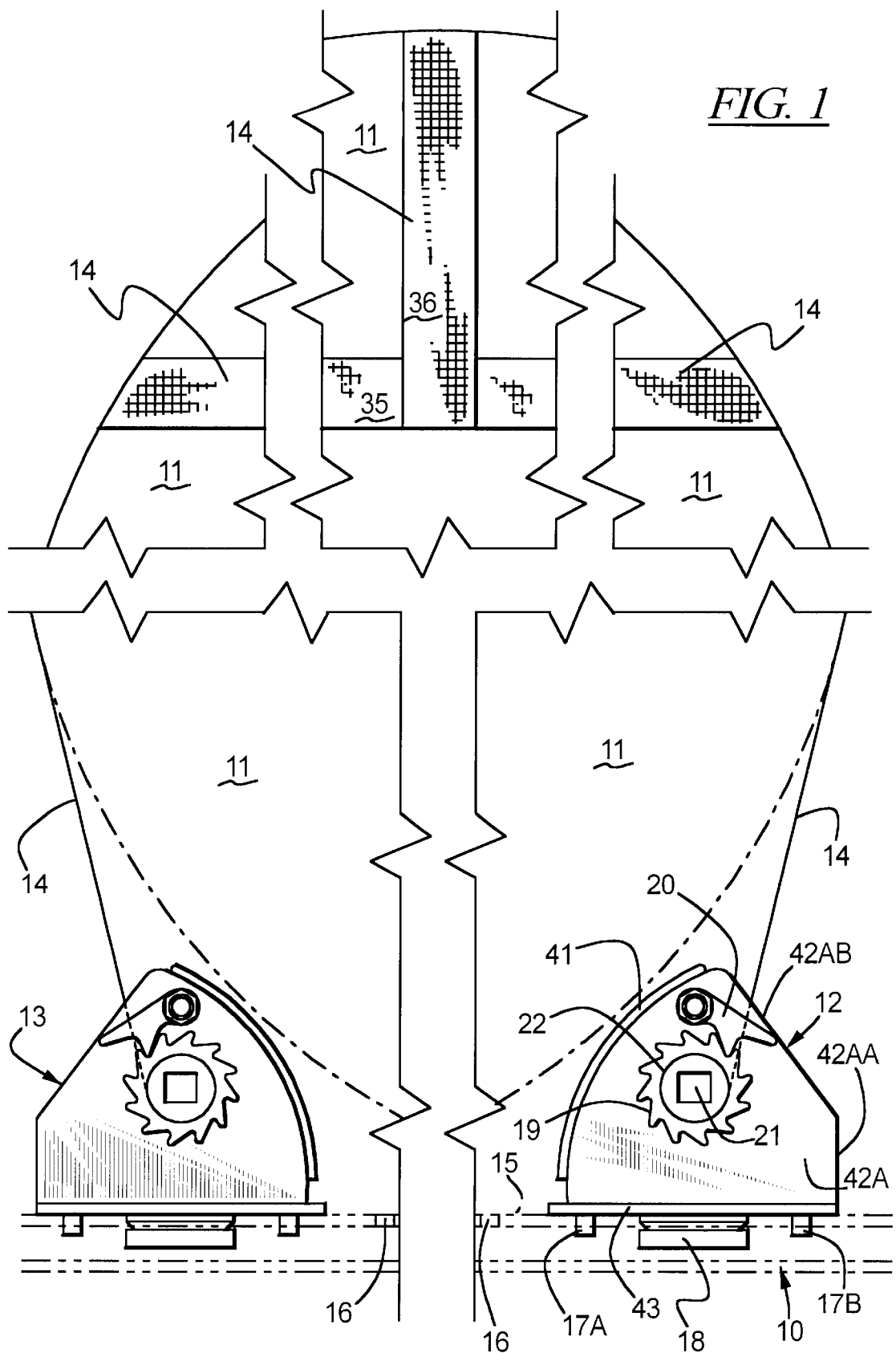
FIG. 1 is a fragmentary side view showing the vehicle tire tie-down system according to the present invention.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The vehicle tire tie-down system and method of the invention is generally illustrated in FIG. 1. A load carrying platform 10 such as on a railcar or other load carrying vehicle such as a truck, airplane or the like, supports a vehicle to be transported. One of the tires of such a vehicle is shown as an example as item 11 in FIG. 1. It is of course understood that one or more of the tires of the vehicle to be secured to the platform may be anchored as explained with the tie-down system of this invention.

A right-hand winch and chock assembly 12 is provided to the right end of the tire 11 and a left-hand winch and chock assembly 13 is provided at the left end of the tire 11. A tire harness 14, details of which are shown in FIG. 7 described hereafter, wraps around the tire. The assembly 13 secures the end 39 of the tire harness 14 and the assembly 12 secures the web loop end 31 of the tire harness 14. Either assembly may be cranked to tighten the tire harness around the wheel. Each of the assemblies 12 and 13 has a respective curved chock surface 41 so that the assemblies 12 and 13 not only provide a winch for tightening the tire harness but simultaneously provide a chock at both ends of the tire. A slanted edge 42AB merging into a vertical edge 42AA are positioned opposite chock surface 41.

An anchor channel 15 is provided at or in a top surface of the platform 10. As shown in FIGS. 2 and 4, the anchor channel 15 has upper inwardly extending flanges 15A and 15B together with notches 16 at spaced locations. These spaced locations preferably correspond to one-half the distance between first and second lugs 17A and 17B. The respective assemblies 12 and 13 are placed onto the channel 15 such that the lugs 17A, 17B enter respective notches 16 when the assembly 12 or 13 is properly positioned at both ends of the tire with the respective chock surfaces in contact or close to contact with the tire.

Figure 5:
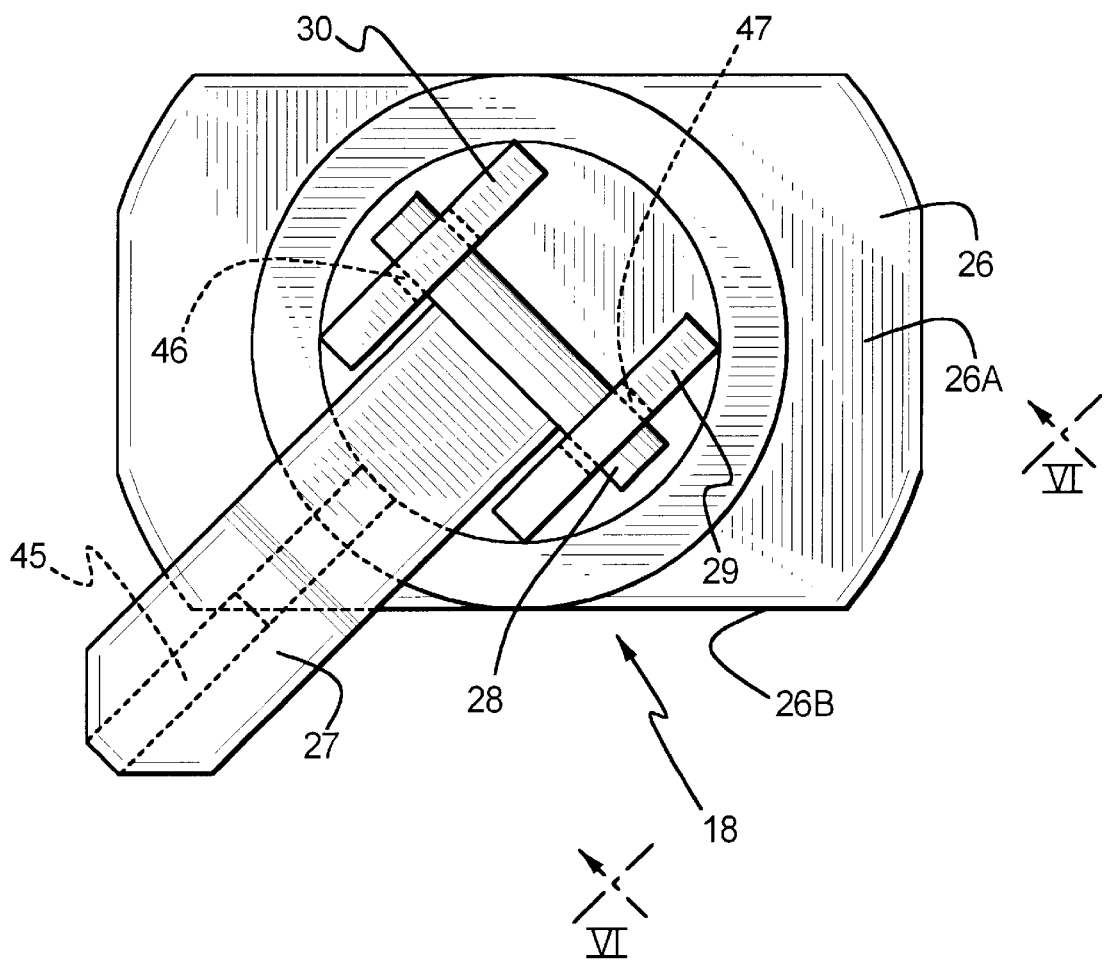
FIG. 5 is a top view of a lock mechanism of the winch and chock assembly of FIG. 2.

A lock mechanism 18 is provided and is formed of a substantially rectangular rotatable lock element 26 having a plate-shape and cut-off corners such as shown in FIG. 5. When the lock handle 27 is pushed to the right, the winch and chock assembly can be placed onto the channel 15 since a longitudinal extent 26B of the lock element 26 is aligned with the longitudinal extent of the channel. Thereafter the lock handle 27 is pushed to the left so that the lock element rotates approximately 90° and the longitudinal ends 26A of the lock element then lie beneath the flanges 15A and 15B as shown in FIG. 4, thus preventing upward movement of the assembly. The lugs 17A and 17B prevent lateral and longitudinal movement when the assembly is locked in position to the channel.

When the lock handle 27 is pushed to the right, the downwardly extending flag portion 45 thereof abuts against a transverse surface 44B of a stop bar 44. When in the locked position, the flag 45 abuts against the inclined edge 44A of the stop bar 44.

As shown in FIG. 1, a ratchet wheel 19 is provided which cooperates with a locking pawl 20. When a driving aperture 21 is engaged with a drive tool, the ends of the tire harness can then be tightened onto the respective mandrel 22.

Each mandrel 22 has two slots 23A and 23B at opposite peripheral sides of the mandrel.

One end of the mandrel 22 has a drive tool receiving portion 22A having the drive aperture 21. The opposite end of the mandrel 22 at 22B is open. This permits insertion as shown in FIG. 3 of a retaining element 40 such as having a rod-shape with bent-down ends at 40A and 40B. The rod 40 is inserted into the open end 22B of the mandrel and into a loop 31 at the end of the tire harness (see FIG. 8) which is inserted through one of the slots 23A or 23B. This retains the web end loop within the mandrel. Alternatively, the free end of the web harness 39 may also be inserted through both of the slots 23A and 23B so that when the respective mandrel is wound, the end of the web harness winds on itself (FIG. 9).

The pawl 20 is retained by a bolt 52 having a head 24 and a retaining nut 25 as shown in FIG. 2. The end of the shaft of the bolt 52 is slightly narrower so that when the bolt 52 is tightened down, it does not tighten against the pawl 20, but rather permits free rotation thereof.

Figure 6:
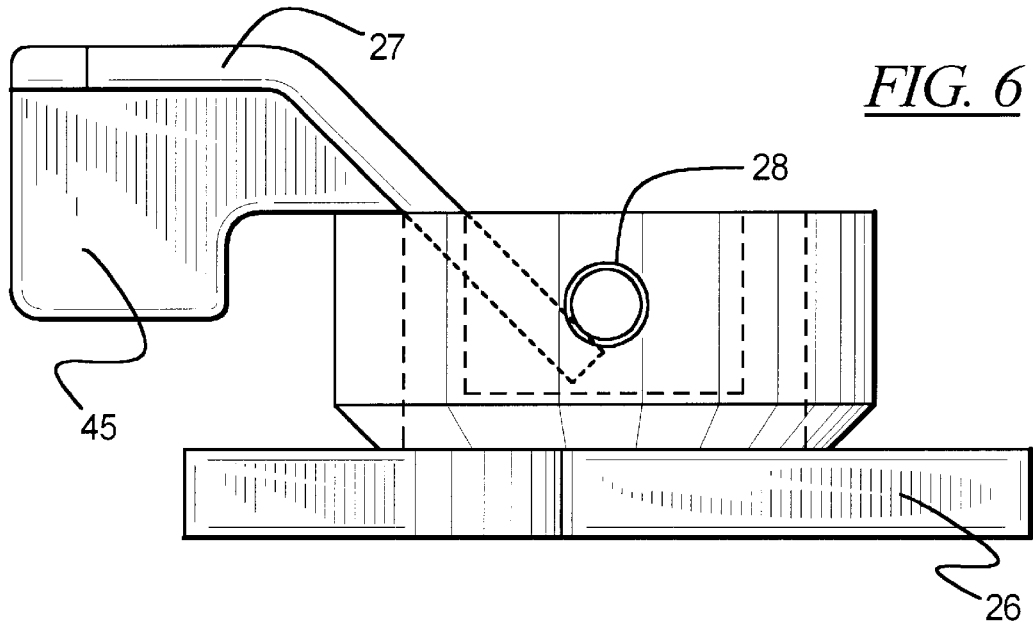
FIG. 6 is an end view of the lock mechanism of FIG. 5.

In FIG. 5, the design of the lock mechanism 18 is shown with the handle 27 secured to a rotatable tubular crossmember 28 which in turn is received at its ends in apertures 46 and 47 in retaining flange members 29 and 30. This is also shown in the side view of FIG. 6.

The lock mechanism 18 is received in an aperture 150 within a base plate 160 of the respective winch and chock assembly 12 or 13 (see FIG. 2). A slip washer 60 is also provided.

As shown in FIG. 7, the tire harness 14 has a central wrap-around web 36 positioned between two half loop webs 34 and 35. These half loop webs are attached to respective three-sided rings 33 and 37 such as in the form of a triangle, for example. An end web 32 and an end web 38 are provided with respective web loop end 31 and web free end 39. As shown in FIGS. 8 and 9, as previously explained these respective ends are attached to the respective mandrels of the respective right and left hand winch and chock assemblies of FIG. 1.

According to the method and system of the invention, the vehicle is first positioned on the platform 10. Then the right and left hand winch and chock assemblies 12 and 13 are positioned at both ends of the tire such that the respective curved choke surfaces 41 either abut or closely abut the tire. The winch and chock assemblies are then locked to the anchor channel 15 by turning the respective lock mechanisms 18 with the lugs 17A, 17B engaged in the respective notches 16. Thereafter, if the web loop end of the tire harness has not yet been engaged with the winch and chock assembly, this is then done by insertion of the retainer pin 40 as previously described. It may be seen that this retainer pin secures at least one end of the tire harness 14 so that it cannot be lost when the system is not being used. Thereafter, the other end 39 of the web is inserted through the two slots of the mandrel of the other winch and chock assembly. Then at least the winch and chock assembly receiving the free end is rotated so that the web harness end 39 tightens down on itself. Thereafter, if desired either one or both of the winch and chock assemblies are utilized by turning their respective mandrels to tighten the tire harness on the wheel. If desired, additional tires of the vehicle may be secured in a similar fashion. It can be seen according to the invention that not only does the system provide a tie-down for the vehicle tire but it also chocks the tire in position simultaneously without the use of additional separate chocks.

Although a particular configuration has been shown for the tire harness, other configurations may be employed by those skilled in the art having free ends. It is possible that the web loop end could be done away with and only free ends used at both ends.

The winch and chock assembly is shown with two vertically spaced walls 42A and 42B which support the mandrel 22 in respective apertures 42C and 42D. The walls are mounted on the base plate 160. Other configurations may be appreciated by those skilled in the art representing some variation from the above for supporting the mandrel. The same is true of the ratchet wheel and pawl wherein other types of winding mandrel systems employing other types of locking mechanisms may be utilized as known by those skilled in the art.

Although the lock mechanism has been shown in one preferred embodiment in FIG. 5, other shapes of the lock element 26 may be provided and other types of handle mechanisms may be used in conjunction with the lock element as may be appreciated by those skilled in the art.

The above variations are true not only for developments existing at the time this patent application was written but also by after developed technology variations.

Finally, although a particular style of anchor channel has been shown in the preferred embodiment, other embodiments may be employed such as other types of lugs or lateral positioning elements cooperating with the anchor channel. Although notches have been shown, other types of positioning elements may be used in conjunction with the anchor channel and the winch and chock assembly to prevent lateral and longitudinal movement of the winch and chock assembly. Such variations would include not only those known to those skilled in the art at the time of this application but also after developed technology.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim as my invention:

1. A method for tying a tire of a vehicle on a load carrying platform, comprising the steps of:

providing an anchor channel at the platform having first and second upper flanges;

providing notches in the first and second upper flanges of the anchor channel;

providing at least first and second integral winch and chock assemblies, each of the assemblies having a rotating lock mechanism having a plate with a longitudinal extent greater then its lateral extent, and also providing spaced lugs on the first and second winch and chock assemblies;

aligning the first and second winch and chock assemblies at both ends of the tire so that a chock surface is at least one of close to and abutting the tire at both ends thereof, and when aligning the winch and chock assemblies aligning said lugs so that said lugs fit within the respective notches at a desired location on the anchor channel, and then rotating the lock mechanism to lock the respective winch and chock assemblies to the anchor channel, the lock mechanism providing a vertical restraint and the lugs in combination with the notches and the anchor channel providing a longitudinal restraint along a longitudinal direction of the anchor channel for the respective first and second winch and chock assemblies, and wherein the lock mechanism is rotated by a handle attached to the lock mechanism;

connecting at least one end of a tire harness to at least one of the winch and chock assemblies; and rotating a winding mandrel of at least one of the winch and chock assemblies so as to tighten the harness on the tire.

2. The method according to claim 1 including the step of first attaching one end of the tire harness to one of the mandrels of one of the winch and chock assemblies, then attaching the other end of the tire harness to the other winch and chock assembly.

3. The method according to claim 1 including the step of providing a loop at one end of the tire harness, securing the loop to the mandrel of one of the winch and chock assemblies, and attaching an opposite free end of the tire harness to the mandrel of the other winch and chock assembly.

4. The method according to claim 1 including the step of providing first and second slots in the mandrels of each of the winch and chock assemblies, and inserting respective free ends of the tire harness through at least one of the slots at each of the mandrels and then tightening at least one of the two mandrels so that the end of the tire harness winds on itself.

5. The method according to claim 4 including the step of providing a web loop at one end of the tire harness, inserting the web loop through one of the two slots, inserting a retaining pin inside of the mandrel through the loop so as to retain the loop within the mandrel, inserting the other end of the tire harness through both slots of the other mandrel of the other winch and chock assembly, and then tightening at least the mandrel of the winch and chock assembly having the free end of the harness passing through both slots so that it winds on itself.

6. A vehicle tire tie-down system for tying a tire of a vehicle down on top of a load carrying platform, comprising:

an anchor member on the platform;

first and second winch and chock assemblies connected to the anchor member by a lock mechanism, the anchor member and lock mechanism preventing lateral, longitudinal and vertical movement of the assemblies;

the winch and chock assemblies each having a winding mandrel for receiving respective first and second ends of a tire harness which wraps around the tire, and the winding mandrels engaging with the respective first or second ends for tightening the tire harness on the tire;

a curved chock surface on and integral with each of the first and second winch and chock assemblies;

said lock mechanism having a rotatable lock element having a longitudinal extent greater than its lateral extent, said lock mechanism being mounted in an aperture in a base plate of the respective winch and chock assemblies;

the lock mechanism having a lock handle for rotational movement of the lock element;

the winch and chock assemblies each having at least one lug received within a notch cut into said anchor member; and the anchor member comprising a channel with first and second horizontal upper flanges defining a slot therebetween.

7. The system according to claim 6 wherein the curved chock surface is positioned radially outwardly from the respective winding mandrel in each of the first and second winch and chock assemblies.

8. A vehicle tire tie-down system for tying a tire of a vehicle down on top of a load carrying platform, comprising:

an anchor member on the platform;

first and second winch and chock assemblies connected to the anchor member by a lock mechanism, the anchor member and lock mechanism preventing lateral, longitudinal and vertical movement of the assemblies;

the winch and chock assemblies each having a winding mandrel for receiving respective first and second ends of a tire harness which wraps around the tire, and the winding mandrels engaging with the respective first or second ends for tightening the harness on the tire;

a chock surface on and integral with each of the first and second winch and chock assemblies; and the chock surface comprising a curved chock surface positioned radially outwardly from the respective winding mandrel in each of the first and second winch and chock assemblies.

9. The system according to claim 8 wherein the winding mandrel has a locking assembly.

10. The system according to claim 9 wherein the locking assembly comprises a pawl and ratchet wheel.

11. The system according to claim 8 wherein the mandrels each have at least first and second slots having a width equal to or greater than a width of ends of the tire harness.

12. A method for tying a tire of a vehicle on a load carrying platform, comprising the steps of:

placing the vehicle on the platform;

aligning at least first and second integral winch and chock assemblies at both ends of the tire so that a chock surface is at least one of close to and abutting the tire at both ends thereof;

locking the winch and chock assemblies to the platform to prevent lateral, longitudinal, and vertical movement of the assemblies;

connecting one end of a tire harness to one of the winch and chock assemblies by providing a loop at one end of the tire harness and securing the loop to a mandrel of the one winch and chock assembly, and attaching an opposite free end of the tire harness to a mandrel of the other winch and chock assembly; and rotating the winding mandrel of at least one of the winch and chock assemblies so as to tighten the harness on the tire.

13. A method for tying a tire of a vehicle on a load carrying platform, comprising the steps of:

providing first and second integral winch and chock assemblies each having a mandrel and providing first and second slots in each mandrel;

placing the vehicle on the platform;

aligning the first and second integral winch and chock assemblies at both ends of the tire so that a chock surface is at least one of close to and abutting the tire at both ends thereof;

locking the winch and chock assemblies to the platform to prevent lateral, longitudinal, and vertical movement of the assemblies;

providing a tire harness with a web loop at one end, the web looping being inserted through one of the two slots of one of the mandrels, a retaining pin being inserted inside of the mandrel through the loop so as to retain the loop within the mandrel, inserting the other free end of the tire harness through both slots of the other mandrel of the other winch and chock assembly, and then tightening at least the mandrel of the winch and chock assembly having the free end of the harness passing through both slots so that it winds on itself and tightens the harness on the tire.

* * * * *